United States Patent
Fujita et al.

(10) Patent No.: US 12,421,339 B2
(45) Date of Patent: Sep. 23, 2025

(54) (METH)ACRYLIC COPOLYMER, PRESSURE-SENSITIVE ADHESIVE COMPOSITION, PRESSURE-SENSITIVE ADHESIVE, AND PRESSURE-SENSITIVE ADHESIVE SHEET

(71) Applicant: Mitsubishi Chemical Corporation, Tokyo (JP)

(72) Inventors: Kanami Fujita, Tokyo (JP); Junichi Nakamura, Tokyo (JP); Hiroko Shinada, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1019 days.

(21) Appl. No.: 17/383,393

(22) Filed: Jul. 22, 2021

(65) Prior Publication Data

US 2021/0347928 A1    Nov. 11, 2021

Related U.S. Application Data

(63) Continuation of application No. PCT/JP2020/001660, filed on Jan. 20, 2020.

(30) Foreign Application Priority Data

Jan. 31, 2019 (JP) ................ 2019-016057

(51) Int. Cl.
| | | |
|---|---|---|
| *C08F 265/06* | (2006.01) | |
| *C08F 2/38* | (2006.01) | |
| *C08F 2/48* | (2006.01) | |
| *C08F 220/06* | (2006.01) | |
| *C08F 220/14* | (2006.01) | |
| *C08F 220/18* | (2006.01) | |
| *C08F 220/30* | (2006.01) | |
| *C09J 7/38* | (2018.01) | |
| *C09J 151/00* | (2006.01) | |

(52) U.S. Cl.
CPC ............ *C08F 265/06* (2013.01); *C08F 2/38* (2013.01); *C08F 2/48* (2013.01); *C08F 220/06* (2013.01); *C08F 220/14* (2013.01); *C08F 220/1804* (2020.02); *C08F 220/1811* (2020.02); *C08F 220/301* (2020.02); *C08F 220/306* (2020.02); *C09J 7/385* (2018.01); *C09J 151/003* (2013.01); *C09J 2301/302* (2020.08); *C09J 2301/416* (2020.08); *C09J 2451/00* (2013.01)

(58) Field of Classification Search
CPC ............ C08F 290/046; C08F 220/1804; C08F 220/06; C08F 220/301
See application file for complete search history.

(56) References Cited

U.S. PATENT DOCUMENTS

| | | | |
|---|---|---|---|
| 2003/0192638 A1 | 10/2003 | Yang et al. | |
| 2004/0010088 A1 | 1/2004 | Husemann et al. | |
| 2005/0276916 A1 | 12/2005 | Yang et al. | |
| 2017/0240782 A1 | 8/2017 | Suwa et al. | |
| 2018/0142055 A1* | 5/2018 | Masuda | ........... C08F 290/046 |

FOREIGN PATENT DOCUMENTS

| | | | |
|---|---|---|---|
| CN | 1585807 A | 2/2005 | |
| JP | H10-168408 A | 6/1998 | |
| JP | 2001-139924 A | 5/2001 | |
| JP | 2006299017 A | * 11/2006 | |
| JP | 2019-081837 A | 5/2019 | |
| TW | 201730284 A | 9/2017 | |
| TW | 201829697 A | 8/2018 | |
| WO | WO-2016194937 A1 | * 12/2016 | ........... C08F 220/62 |
| WO | 2017/099113 A1 | 6/2017 | |

OTHER PUBLICATIONS

Office Action issued in related Chinese Patent Application No. 202080008928.8 dated Jul. 13, 2023.
Office Action issued in related Chinese Patent Application No. 202080008928.8 dated Feb. 15, 2023.
Office Action issued Jul. 17, 2024 for European Patent Application No. 20748842.0.
Extended European Search Report issued in corresponding European Patent Application No. 20748842.0 dated Feb. 4, 2022.
Decision of Rejection issued in corresponding Chinese Patent Application No. 202080008928.8 dated Jan. 2, 2024.
International Search Report issued in related International Patent Application No. PCT/JP2020/001660 dated Mar. 31, 2020.
Office Action issued in related Japanese Patent Application No. 2020-507119 dated Mar. 23, 2021.

* cited by examiner

*Primary Examiner* — Eli D. Strah
(74) *Attorney, Agent, or Firm* — Morgan, Lewis & Bockius LLP

(57) ABSTRACT

There is provided a (meth)acrylic copolymer with which a pressure-sensitive adhesive layer exhibiting excellent low temperature coatability and exhibiting holding power and excellent base material contamination resistance even in a case of being irradiated with a low dose of UV irradiation can be formed. The (meth)acrylic copolymer of the present invention comprises a constituent unit a derived from a macromonomer and a constituent unit b derived from a monomer represented by Formula (b), where a content of the constituent unit b is 0.01% to 25% by mass with respect to a total mass of the (meth)acrylic copolymer. In Formula (b), $R^A$ and $R^B$ each independently represent an alkyl group, a carboxy group, or a halogen atom, n represents an integer of 0 to 5, m represents an integer of 0 to 4, and X represents a (meth)acryloyloxy group or a (meth)acryloyloxyalkyleneoxy group.

15 Claims, No Drawings

(METH)ACRYLIC COPOLYMER, PRESSURE-SENSITIVE ADHESIVE COMPOSITION, PRESSURE-SENSITIVE ADHESIVE, AND PRESSURE-SENSITIVE ADHESIVE SHEET

This application is a continuation application of International Application No. PCT/JP2020/001660, filed on Jan. 20, 2020, which claims the benefit of priority of the prior Japanese Patent Application No. 2019-016057, filed Jan. 31, 2019, the content of which is incorporated herein by reference.

TECHNICAL FIELD

The present invention relates to a (meth)acrylic copolymer, a pressure-sensitive adhesive composition containing the (meth)acrylic copolymer, a pressure-sensitive adhesive obtained by curing the pressure-sensitive adhesive composition, and a pressure-sensitive adhesive sheet containing the pressure-sensitive adhesive.

BACKGROUND ART

As a pressure-sensitive adhesive composition that can be applied onto a base material and is cured by irradiation with an ultraviolet ray, a composition containing a copolymer obtained by polymerizing an acrylic acid alkyl ester having an alkyl group having 1 to 4 carbon atoms, an unsaturated carboxylic acid such as acrylic acid, and a benzophenone derivative having a (meth)acryloyloxy group is known (Patent Document 1).

CITATION LIST

Patent Document

[Patent Document 1]
Japanese Unexamined Patent Application, First Publication No. 2006-299017

SUMMARY OF INVENTION

Technical Problem

However, the composition disclosed in Patent Document 1 has a high melt viscosity, and thus it has been necessary to raise the temperature at the time of coating. Further, a pressure-sensitive adhesive layer formed by using the composition described in Patent Document 1 had not sufficient resistance (the base material contamination resistance) to the occurrence of the adhesive residue in a case where the pressure-sensitive adhesive layer was re-peeled after being bonded to the base material.

The present invention provides a (meth)acrylic copolymer with which a pressure-sensitive adhesive layer exhibiting excellent low temperature coatability and exhibiting holding power and excellent base material contamination resistance even in a case of being irradiated with a low dose of UV irradiation can be formed, a pressure-sensitive adhesive composition, and a pressure-sensitive adhesive sheet obtained by using the pressure-sensitive adhesive composition.

Solution to Problem

The present invention has the following aspects.

[1] A (meth)acrylic copolymer comprising a constituent unit a derived from a macromonomer and a constituent unit b derived from a monomer represented by Formula (b), wherein a content of the constituent unit b is 0.01% to 25% by mass with respect to a total mass of the (meth)acrylic copolymer,

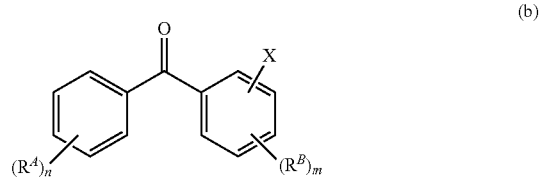

(in the formula, $R^A$ and $R^B$ each independently represent an alkyl group, a carboxy group, or a halogen atom, n represents an integer of 0 to 5, m represents an integer of 0 to 4, and X represents a (meth)acryloyloxy group or a (meth)acryloyloxyalkyleneoxy group).

[2] The (meth)acrylic copolymer according to [1], wherein the macromonomer contains two or more constituent units X1 represented by Formula X1,

(in the formula, $R^1$ represents a hydrogen atom, a methyl group, or $CH_2OH$, $R^2$ represents $OR^3$, a halogen atom, $COR^4$, $COOR^5$, CN, $CONR^6R^7$, $NHCOR^8$, or $R^9$, where $R^3$ to $R^8$ each independently represent a hydrogen atom, an alkyl group which is unsubstituted or has a substituent, an alicyclic group which is unsubstituted or has a substituent, an aryl group which is unsubstituted or has a substituent, a heteroaryl group which is unsubstituted or has a substituent, a non-aromatic heterocyclic group which is unsubstituted or has a substituent, an aralkyl group which is unsubstituted or has a substituent, an alkaryl group which is unsubstituted or has a substituent, an organosilyl group which is unsubstituted or has a substituent, or a (poly)organosiloxane group which is unsubstituted or has a substituent, and $R^9$ represents an aryl group which is unsubstituted or has a substituent, a heteroarylgroup which is unsubstituted or has a substituent, or a non-aromatic heterocyclic group which is unsubstituted or has a substituent).

[3] The (meth)acrylic copolymer according to [1] or [2], wherein the macromonomer has a weight average molecular weight of 500 to 100,000.

[4] The (meth)acrylic copolymer according to any one of [1] to [3], wherein the macromonomer contains the constituent unit b.

[5] The (meth)acrylic copolymer according to any one of [1] to [4], wherein a content of the constituent unit a is 0.1% to 40% by mass with respect to the total mass of the (meth)acrylic copolymer.

[6] The (meth)acrylic copolymer according to any one of [1] to [5], wherein the (meth)acrylic copolymer contains a constituent unit derived from a (meth)acrylate having an alicyclic structure.

[7] The (meth)acrylic copolymer according to [6], wherein the (meth)acrylate having an alicyclic structure is an isobornyl (meth)acrylate.

[8] The (meth)acrylic copolymer according to [6] or [7], wherein a content of the constituent unit derived from the (meth)acrylate having an alicyclic structure is 0.1% to 20% by mass with respect to the total mass of the (meth)acrylic copolymer.

[9] The (meth)acrylic copolymer according to any one of [1] to [8], wherein the (meth)acrylic copolymer contains a constituent unit derived from a carboxy group-containing (meth)acrylate.

[10] The (meth)acrylic copolymer according to [9], wherein a content of the constituent unit derived from the carboxy group-containing (meth)acrylate is 0.1% to 20% by mass with respect to the total mass of the (meth)acrylic copolymer.

[11] A pressure-sensitive adhesive composition comprising the (meth)acrylic copolymer according to any one of [1] to [10].

[12] A pressure-sensitive adhesive obtained by irradiating the pressure-sensitive adhesive composition according to [11] with an ultraviolet ray.

[13] A pressure-sensitive adhesive sheet comprising a pressure-sensitive adhesive layer containing the pressure-sensitive adhesive according to [12].

Advantageous Effects of Invention

With the (meth)acrylic copolymer of the present invention, a pressure-sensitive adhesive layer exhibiting excellent base material contamination resistance can be formed.

With the pressure-sensitive adhesive composition of the present invention, a pressure-sensitive adhesive layer exhibiting excellent base material contamination resistance can be formed.

The pressure-sensitive adhesive sheet of the present invention exhibits excellent base material contamination resistance.

DESCRIPTION OF EMBODIMENTS

The definitions of the following terms apply throughout the present specification and the scope of the claims.

The "(meth)acrylate" is a general term for acrylate and methacrylate.

The "(meta) acrylic acid" is a general term for acrylic acid and methacrylic acid.

The "(meth)acrylic copolymer" means a copolymer in which at least a part of the constituent units is a constituent unit derived from a (meth)acrylic monomer. The (meth)acrylic copolymer may further contain a constituent unit derived from a monomer (for example, styrene) other than the (meth)acrylic monomer.

The "(meth)acrylic monomer" means a monomer having a (meth)acryloyl group.

The "(meta)acryloyl" is a general term for acryloyl and methacryloyl.

The "to" indicating a numerical range is used to mean that both numerical values described before and after "to" are included as a lower limit value and an upper limit value.

The number average molecular weight and weight average molecular weight of the macromonomer and the (meth)acrylic copolymer are polystyrene-based molecular weights determined by gel permeation chromatography (GPC).

The glass transition temperature of the (meth)acrylic copolymer is a calculated value obtained by the Fox calculation expression.

For example, in a case where the (meth)acrylic copolymer is composed of a constituent unit p derived from a macromonomer, a constituent unit q derived from a monomer q, and a constituent unit r derived from any monomer r, Tg is calculated by the following Fox calculation expression from the glass transition temperature and the mass fraction of each of the homopolymers of the monomer used in the production of the macromonomer, the monomer q, and the monomer r, which is defined as the glass transition temperature (unit: ° C.) of the (meth)acrylic copolymer.

$$1/(273+Tg)=\Sigma(Wi/(273+Tgi))$$

In the formula, Wi represents the mass fraction of the monomer i, and Tgi represents the glass transition temperature (° C.) of the homopolymer of the monomer i.

As the glass transition temperature of the homopolymer of the monomer i, a value described in the Polymer Handbook [J. Brandrup, Interscience, 1989] can be used.

The (meth)acrylic copolymer of the present invention contains a constituent unit a derived from a macromonomer and a constituent unit b derived from a monomer represented by Formula (b).

The (meth)acrylic copolymer of the present invention can be produced by copolymerizing a mixture of a (meth)acrylic monomers, containing a macromonomer and a monomer represented by Formula (b). The (meth)acrylic copolymer of the present invention becomes a graft copolymer by copolymerizing the macromonomer, a phase-separated structure is developed, and the holding power and the base material contamination resistance are improved. Further, a cross-linked structure is formed by the constituent unit b having an ultraviolet ray-reactive group that generates radicals by irradiation with an ultraviolet ray, and thus the holding power is improved.

[Macromonomer (Constituent Unit a Derived from Macromonomer)]

The macromonomer in the present invention is a compound having two or more constituent units derived from a radically polymerizable group (a1) and a monomer (a2) having a radically polymerizable group.

The radically polymerizable group (a1) is preferably a group having an ethylenically unsaturated bond is preferable. Examples of the group having an ethylenically unsaturated bond include $CH_2=C(COOR)-CH_2-$, a (meth)acryloyl group, a 2-(hydroxymethyl)acryloyl group, and a vinyl group.

Here, R represents a hydrogen atom, an alkyl group which is unsubstituted or has a substituent, an alicyclic group which is unsubstituted or has a substituent, an aryl group which is unsubstituted or has a substituent, or a heterocyclic group which is unsubstituted or has a substituent.

Examples of the alkyl group as R include a branched or linear alkyl group having 1 to 20 carbon atoms. Specific examples of the branched or linear alkyl group having 1 to 20 carbon atoms include a methyl group, an ethyl group, an n-propyl group, an i-propyl group, an n-butyl group, a t-butyl group, an i-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group.

The alicyclic group as R may be a monocyclic group or a polycyclic group, and examples thereof include an alicyclic group having 3 to 20 carbon atoms. The alicyclic group is preferably a saturated alicyclic group such as a cycloalkyl group, and specific examples thereof include a cyclopropyl group, a cyclobutyl group, a cyclopentyl group, a cyclohexyl group, a cycloheptyl group, a bicyclo[2.2.1]heptyl group, a cyclooctyl group, and an adamantyl group.

Examples of the aryl group as R include an aryl group having 6 to 18 carbon atoms. Specific examples of the aryl group having 6 to 18 carbon atoms include a phenyl group and a naphthyl group.

Examples of the heterocyclic group as R include a heterocyclic group having 5 to 18 carbon atoms. Specific examples of the heterocyclic group having 5 to 18 carbon atoms include oxygen atom-containing heterocyclic groups such as a γ-butyrolactone group and an ε-caprolactone group; and nitrogen atom-containing heterocyclic groups such as a pyridyl group, a carbazolyl group, a pyrrolidinyl group, a pyrrolidone group, and a morpholino group.

The alkyl group, the alicyclic group, the aryl group, and the heterocyclic group may each have a substituent. Examples of the substituent include at least one selected from the group consisting of an alkyl group (however, a case where R is an alkyl group having a substituent is excluded), an aryl group, —COOR$^{51}$, a cyano group, —OR$^{52}$, —NR$^{53}$R$^{54}$, —CONR$^{55}$R$^{56}$, a halogen atom, an allyl group, an epoxy group, a siloxy group, and a group exhibiting hydrophilicity or ionicity.

Here, R$^{51}$ to R$^{56}$ each independently represent a hydrogen atom, an alkyl group, an alicyclic group, or an aryl group. Examples of these groups include the same groups as those described above.

Examples of the alkyl group and the aryl group as the substituent include the same groups as the alkyl group and the aryl group as R, respectively.

R$^{51}$ of —COOR$^{51}$ as the substituent is preferably a hydrogen atom or an alkyl group. That is, —COOR$^{51}$ is preferably a carboxy group or an alkoxycarbonyl group. Examples of the alkoxycarbonyl group include a methoxycarbonyl group.

R$^{52}$ of —OR$^{52}$ as the substituent is preferably a hydrogen atom or an unsubstituted alkyl group. That is, —OR$^{52}$ is preferably a hydroxy group or an alkoxy group. Examples of the alkoxy group include an alkoxy group having 1 to 12 carbon atoms, and specific examples thereof include a methoxy group.

Examples of —NR$^{53}$R$^{54}$ as the substituent include an amino group, a monomethylamino group, and a dimethylamino group.

Examples of the —CONR$^{55}$R$^{56}$ as the substituent include a carbamoyl group (—CONH$_2$), an N-methylcarbamoyl group (—CONHCH$_3$), and an N,N-dimethylcarbamoyl group (a dimethylamide group: —CON(CH$_3$)$_2$).

Examples of the halogen atom as the substituent include a fluorine atom, a chlorine atom, a bromine atom, and an iodine atom.

Examples of the group exhibiting hydrophilicity or ionicity as the substituent include an alkali salt of a carboxy group and an alkali salt of a sulfo group; a poly(alkylene oxide) group such as a polyethylene oxide group or a polypropylene oxide group; and a cationic substituent such as a quaternary ammonium base.

R is preferably an alkyl group or a saturated alicyclic group, and more preferably an alkyl group or a saturated alicyclic group which is unsubstituted or has an alkyl group as a substituent.

Among the above, in terms of the easiness of availability, a methyl group, an ethyl group, an n-propyl group, an i-propyl group, an n-butyl group, a t-butyl group, a pentyl group, a hexyl group, a heptyl group, an octyl group, a cyclopropyl group, a cyclobutyl group, an isobornyl group, or an adamantyl group is preferable, and a methyl group, an ethyl group, an n-propyl group, an i-propyl group, an n-butyl group, a t-butyl group, a cyclopropyl group, a cyclobutyl group, an isobornyl group, or an adamantyl group is more preferable.

Examples of the monomer (a2) having a radically polymerizable group include hydrocarbon group-containing (meth)acrylic acid esters such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, 2-ethylhexyl (meth)acrylate, octyl (meth)acrylate, rauryl (meth)acrylate, stearyl (meth)acrylate, isostearyl (meth)acrylate, hexadecyl (meth)acrylate, nonyl (meth)acrylate, isononyl (meth)acrylate, phenyl (meth)acrylate, benzyl (meth)acrylate, cyclohexyl (meth)acrylate, tetrahydrofurfuryl (meth)acrylate, isobornyl (meth)acrylate, 3,5,5-trimethylcyclohexyl (meth)acrylate, dicyclopentanyl (meth)acrylate, dicyclopentenyl (meth)acrylate, dicyclopentenyloxyethyl (meth)acrylate, terpene acrylate and a derivative thereof, a hydrogenated rosin acrylate and a derivative thereof, and docosyl (meth)acrylate;

hydroxyl group-containing (meth)acrylic acid esters such as 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, and glycerol (meth)acrylate;

carboxyl group-containing vinyl-based monomers such as (meth)acrylic acid, 2-(meth)acryloyloxyethyl hexahydrophthalic acid, 2-(meth)acryloyloxypropyl hexahydrophthalic acid, 2-(meth)acryloyloxyethyl phthalic acid, 2-(meth)acryloyloxy propylphthalic acid, 2-(meth)acryloyloxyethyl maleic acid, 2-(meth)acryloyloxypropyl maleic acid, 2-(meth)acryloyloxyethyl succinic acid, 2-(meth)acryloyloxypropyl succinic acid, crotonic acid, fumaric acid, maleic acid, itaconic acid, citraconic acid, monomethyl maleate, monoethyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, and monoethyl citraconate;

acid anhydride group-containing vinyl-based monomers such as maleic anhydride and itaconic anhydride;

unsaturated dicarboxylic acid diester monomers such as dimethyl malate, dibutyl malate, dimethyl fumarate, dibutyl fumarate, and dibutyl itaconate, diperfluorocyclohexyl fumarate;

epoxy group-containing vinyl-based monomers such as glycidyl (meth)acrylate, glycidyl α-ethyl acrylate, and 3,4-epoxybutyl (meth)acrylate;

amino group-containing (meth)acrylic acid ester-based vinyl monomers such as dimethylaminoethyl (meth)acrylate and diethylaminoethyl (meth)acrylate;

vinyl-based monomers containing an amide group, such as (meth)acrylamide, N-t-butyl (meth)acrylamide, N-methylol (meth)acrylamide, N-isopropyl acrylamide, hydroxyethyl acrylamide, N-methoxymethyl (meth)acrylamide, N-butoxymethyl (meth)acrylamide, diacetone acrylamide, maleic acid amide, and maleimide;

vinyl-based monomers such as styrene, α-methyl styrene, vinyl toluene, (meth)acrylonitrile, vinyl chloride, vinyl acetate, and vinyl propionate;

polyfunctional vinyl-based monomers such as divinyl benzene, ethylene glycol di(meth)acrylate, 1,3-butylene glycol di(meth)acrylate, 1,4-butanediol di(meth)acrylate, 1,6-hexanediol di(meth)acrylate, diethylene glycol di(meth)acrylate, triethylene glycol di(meth)acrylate, tetraethylene glycol di(meth)acrylate, polyethylene glycol di(meth)acrylate, tripropylene glycol di(meth)acrylate, neopentyl glycol di(meth)acrylate, 1,9-nonandiol di(meth)acrylate, 1,10-decanediol di(meth)acrylate, trimethylolpropane tri(meth)acrylate, pentaerythritol tetra(meth)acrylate, dipentaerythritol hexa(meth)acrylate, allyl (meth)acrylate, triallyl cyanurate, diallyl maleate, polypropylene glycol diallyl ether, and N,N'-methylene bis(meth)acrylamide;

acryloylmorpholine, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, ethoxyethoxyethyl (meth)acrylate, phenoxyethyl (meth)acrylate, nonylphenoxyethyl (meth)acrylate, 3-methoxybutyl (meth)acrylate, acetoxyethyl (meth)acrylate, "PLAXEL FM (registered trade name, the same applies hereinafter)" (a caprolactone-added monomer manufactured by Daicel Corporation, trade name), "BLEMMER PME-100 (registered trade name, the same applies hereinafter)" (methoxypolyethylene glycol methacrylate (having two ethylene glycol chains) manufactured by NOF Corporation, trade name), "BLEMMER PME-200" (methoxypolyethylene glycol methacrylate (having four ethylene glycol chains) manufactured by NOF Corporation, trade name)), "BLEMMER PME-400" (methoxypolyethylene glycol methacrylate (having nine ethylene glycol chains) manufactured by NOF Corporation, trade name)), "BLEMMER 50 POEP-800B" (manufactured by NOF Corporation, octoxypolyethylene glycol-polypropylene glycol-methacrylate (having eight ethylene glycol chains and six propylene glycol chains), trade name), "BLEMMER 20 ANEP-600" (nonylphenoxy(ethylene glycol-polypropylene glycol) monoacrylate manufactured by NOF Corporation, trade name), "BLEMMER AME-100" (manufactured by NOF Corporation, trade name), "BLEMMER AME-200" (manufactured by NOF Corporation, trade name), "BLEMMER 50 AOEP-800B" (manufactured by NOF Corporation, trade name), organosilyl group-containing monomers other than the silane coupling agent-containing monomers, such as trimethylsilyl (meth)acrylate, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri(s-butyl)silyl (meth)acrylate, tri(2-methylisopropyl)silyl (meth)acrylate, tri(t-butyl)silyl (meth)acrylate, ethyldimethylsilyl (meth)acrylate, n-butyldimethylsilyl (meth)acrylate, diisopropyl(n-butyl)silyl (meth)acrylate, n-octyldi(n-butyl)silyl (meth)acrylate, diisopropylstearylsilyl (meth)acrylate, dicyclohexylphenylsilyl (meth)acrylate, t-butyldiphenylsilyl (meth)acrylate, lauryldiphenylsilyl (meth)acrylate, triisopropylsilylmethyl malate, triisopropylsilylamyl malate, tri(n-butyl)silyl(n-butyl) malate, (t-butyldiphenylsilyl)(methyl) malate, (t-butyldiphenylsilyl)(n-butyl) malate, (triisopropylsilyl)(methyl) fumarate, (triisopropylsilyl)(amyl) fumarate, (tri(n-butylsilyl))(n-butyl) fumarate, (t-butyldiphenylsilyl)(methyl) fumarate, (t-butyldiphenylsilyl)(n-butyl) fumarate, Silaplane (registered trade name, the same applies hereinafter) FM-0701T (manufactured by JNC corporation, trade name), Silaplane FM-0721 (manufactured by JNC corporation, trade name), Silaplane FM-0725 (manufactured by JNC corporation, trade name), Silaplane TM-0701 (manufactured by JNC corporation, trade name), Silaplane TM-0701T (manufactured by JNC corporation, trade name), X-22-174ASX (manufactured by Shin-Etsu Chemical Co., Ltd., trade name), X-22-174BX (manufactured by Shin-Etsu Chemical Co., Ltd., trade name), KF-2012 (manufactured by Shin-Etsu Chemical Co., Ltd., trade name), X-22-2426 (manufactured by Shin-Etsu Chemical Co., Ltd., trade name), and X-22-2404 (manufactured by Shin-Etsu Chemical Co., Ltd., trade name);

halogenated olefins such as vinyl chloride, vinylidene chloride, vinyl fluoride, vinylidene fluoride, and chlorotrifluoroethylene;

fluorine-containing monomers (however, the halogenated olefins are excluded) such as 2,2,2-trifluoroethyl (meth)acrylate, 2,2,3,3,3-pentafluorophenyl (meth)acrylate, 2-(perfluorobutyl) ethyl (meth)acrylate, 3-(perfluorobutyl)-2-hydroxypropyl (meth)acrylate, 2-(perfluorohexyl)ethyl (meth)acrylate, 3-perfluorohexyl-2-hydroxypropyl (meth)acrylate, 3-(perfluoro-3-methylbutyl)-2-hydroxypropyl (meth)acrylate, 2,2,3,3-tetrafluoropropyl (meth)acrylate, 1H,1H,5H-octafluoropentyl (meth)acrylate, 1H,1H,2H,2H-tridecafluorooctyl (meth)acrylate, 1H-1-(trifluoromethyl)trifluoroethyl (meth)acrylate, 1H,1H,3H-hexafluorobutyl (meth)acrylate, and 1,2,2,2-tetrafluoro-1-(trifluoromethyl)ethyl (meth)acrylate;

monomers having an acetal structure such as 1-butoxyethyl (meth)acrylate, 1-(2-ethylhexyloxy)ethyl (meth)acrylate, 1-(cyclohexyloxy)ethyl methacrylate, and 2-tetrahydropyranyl (meth)acrylate; and a monomer which is a benzophenone derivative having a (meth)acryloyloxy group or a (meth)acryloyloxyalkyleneoxy group and which is represented by Formula (b).

These monomers may be used alone or in a combination of two or more thereof.

The monomer (a2) having a radically polymerizable group preferably has a structure of Formula (X1).

(X1)

(In the formula, $R^1$ represents a hydrogen atom, a methyl group, or $CH_2OH$, $R^2$ represents $OR^3$, a halogen atom, $COR^4$, $COOR^5$, CN, $CONR^6R^7$, $NHCOR^8$, or $R^9$, where $R^3$ to $R^8$ each independently represent a hydrogen atom, an alkyl group which is unsubstituted or has a substituent, an alicyclic group which is unsubstituted or has a substituent, an aryl group which is unsubstituted or has a substituent, a heteroaryl group which is unsubstituted or has a substituent, a non-aromatic heterocyclic group which is unsubstituted or has a substituent, an aralkyl group which is unsubstituted or has a substituent, an alkaryl group which is unsubstituted or has a substituent, an organosilyl group which is unsubstituted or has a substituent, or a (poly)organosiloxane group which is unsubstituted or has a substituent, and $R^9$ represents an aryl group which is unsubstituted or has a substituent, a heteroaryl group which is unsubstituted or has a substituent, or a non-aromatic heterocyclic group which is unsubstituted or has a substituent.)

The alkyl group, the alicyclic group, the aryl group, the heteroaryl group, the non-aromatic heterocyclic group, the aralkyl group, the alkaryl group, the organosilyl group, and the (poly)organosiloxane group, as $R^3$ to $R^8$, may each have a substituent. Examples of the substituent include at least one group selected from the group consisting of an alkyl group (however, a case where $R^3$ to $R^8$ are an alkyl group having a substituent is excluded), an aryl group, a carboxyl group, an alkoxycarbonyl group, a cyano group, a hydroxyl group, an amino group, an amide group, a halogen atom, an allyl group, an epoxy group, an alkoxy group, a siloxy group, and a group exhibiting hydrophilicity or ionicity.

It is preferable that a constituent unit derived from the (meth)acrylic monomer is contained as the constituent unit derived from the monomer (a2) having a radically polymerizable group. The content of the constituent unit derived from the (meth)acrylic monomer is preferably 50% by mass or more, more preferably 70% by mass or more, and still more preferably 80% by mass or more, with respect to all the constituent units of the macromonomer.

The macromonomer is particularly preferably a macromonomer represented by Formula (X2).

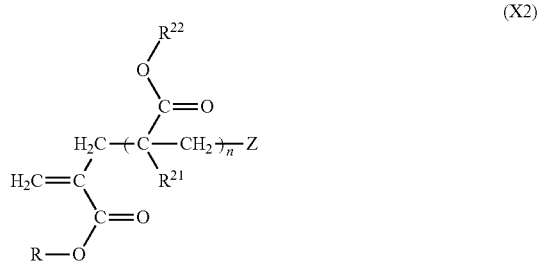

(X2)

(In the formula, R is synonymous with that described above, Z is a terminal group, $R^{21}$ represents a hydrogen atom or a methyl group, and $R^{22}$ represents represent a hydrogen atom, an alkyl group which is unsubstituted or has a substituent, an alicyclic group which is unsubstituted or has a substituent, an aryl group which is unsubstituted or has a substituent, a heteroaryl group which is unsubstituted or has a substituent, an aralkyl group which is unsubstituted or has a substituent, an alkaryl group which is unsubstituted or has a substituent, an organosilyl group which is unsubstituted or has a substituent, or a (poly)organosiloxane group which is unsubstituted or has a substituent, where the substituents in these groups are at least one selected from the group consisting of an alkyl group, an aryl group, a heteroaryl group, a non-aromatic heterocyclic group, an aralkyl group, an alkaryl group, a carboxylic acid group, a carboxylic acid ester group, an epoxy group, a hydroxy group, an alkoxy group, a primary amino group, a secondary amino group, a tertiary amino group, an isocyanato group, a sulfonic acid group, and a halogen atom. n represents a natural number of 2 or more.)

In Formula (X2), examples of the terminal group as Z include a hydrogen atom and a group derived from a radical polymerization initiator, similarly to the terminal group of a polymer obtained by known radical polymerization.

Each group as R22 is the same as the group described in $R^5$ of $COOR^5$.

n is a natural number of 2 or more. n is in the range where the number average molecular weight (Mn) of the macromonomer is 500 or more and 100,000 or less. The preferred range of the number average molecular weight will be described later. All of the n pieces of $R^{21}$ may be the same or a part thereof may be different. All of the n pieces of $R^{22}$ may be the same or a part thereof may be different.

The weight average molecular weight of the macromonomer is preferably 500 to 100,000, more preferably 600 to 50,000, and still more preferably 1,000 to 20,000. In a case where the weight average molecular weight of the macromonomer is within the above range, the balance between adhesive power and handleability (compatibility with other components, coatability, hot-melt processability, or the like) tends to be improved.

Further, since the holding power and the base material contamination resistance are improved, the content of the constituent unit a derived from the macromonomer is preferably 0.1% to 40% by mass and more preferably 0.5% to 30% by mass with respect to the total mass of the (meth)acrylic copolymer.

The (meth)acrylic copolymer of the present invention may contain, as the constituent unit a, a structural unit derived from only one kind of macromonomer or may contain a constituent unit derived from two or more kinds of macromonomers.

As the macromonomer, a macromonomer produced by a known method may be used, or a commercially available macromonomer may be used.

Examples of the method of producing a macromonomer include a method of producing a macromonomer using a cobalt chain transfer agent, a method using an α-substituted unsaturated compound such as an α-methylstyrene dimer as a chain transfer agent, a method using an initiator, and a method of chemically bonding a radically polymerizable group to a polymer, and a method of thermal decomposition.

[Monomer Represented by Formula (b) (Constituent Unit b Derived from Monomer Represented by Formula (b))]

The constituent unit b is a constituent unit derived from a monomer (hereinafter, also referred to as a "monomer b") represented by Formula (b).

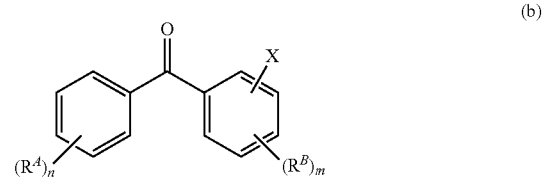

(b)

(In the formula, $R^A$ and $R^B$ each independently represent an alkyl group, a carboxy group, or a halogen atom, n represents an integer of 0 to 5, m represents an integer of 0 to 4, and X represents a (meth)acryloyloxy group or a (meth)acryloyloxyalkyleneoxy group.)

The monomer b is a benzophenone derivative having a (meth)acryloyloxy group or a (meth)acryloyloxyalkyleneoxy group.

Examples of the alkyl group as $R^A$ and $R^B$ include a methyl group, an ethyl group, and a propyl group.

Examples of the halogen atom as $R^A$ and $R^B$ include a fluorine atom, a chlorine atom, a bromine atom, and an iodine atom.

The bonding position of X is preferably the 2-position, the 4-position, or the 6-position, and more preferably the 4-position.

Examples of the monomer b include 4-acryloyloxybenzophenone, 4-methacryloyloxybenzophenone, 4-[2-(acryloyloxy)ethoxy]benzophenone, and 4-[2-(methacryloyloxy)ethoxy]benzophenone, and 4-methacryloyloxybenzophenone is particularly preferable.

The (meth)acrylic copolymer of the present invention may contain, as the constituent unit b, a constituent unit derived from only one kind of monomer b or may contain a constituent unit derived from two or more kinds of monomers b.

The content of the constituent unit b is 0.01% to 25% by mass and preferably 0.02% to 10% by mass, with respect to the total mass of the (meth)acrylic copolymer. In a case where the content of the constituent unit b is equal to or more than the above lower limit value, sufficient base material contamination resistance and holding power can be obtained in the pressure-sensitive adhesive layer formed by using the (meth)acrylic copolymer. In a case where the content of the constituent unit b is equal to or less than the upper limit value, coatability is improved, and a sufficient balance between the adhesive power and the holding power can be obtained.

In a case where the constituent unit b is also contained in the macromonomer as a constituent unit derived from the monomer (a2) having a radically polymerizable group of the macromonomer, the constituent unit b contained in the macromonomer is also included in the content of the constituent unit b contained in the (meth)acrylic copolymer.

[Another Monomer c (Constituent Unit Derived from Another Monomer c)]

The (meth)acrylic copolymer of the present invention may contain a constituent unit other than the constituent unit a derived from a macromonomer and the constituent unit b derived from a monomer represented by Formula (b).

The monomer from which the constituent unit (hereinafter, also referred to as the "monomer c") other than the constituent unit a and the constituent unit b is derived is not particularly limited as long as it is polymerizable with the macromonomer and the monomer represented by Formula (b), and various monomers having a radically polymerizable group such as an ethylenically unsaturated bond can be used. For example, a monomer that is the same as the monomer (a2) having a radically polymerizable group for obtaining a macromonomer (however, the macromonomer and the monomer represented by Formula (b) are excluded) can be used.

The (meth)acrylic copolymer of the present invention may contain, as the constituent unit c, a structural unit derived from only one kind of monomer c or may contain a constituent unit derived from two or more kinds of monomers c.

Since the melt viscosity of the polymer is lowered and the coatability is improved, the (meth)acrylic copolymer of the present invention preferably contains, as the constituent unit c, a constituent unit derived from a (meth)acrylate having an alicyclic structure. The constituent unit derived from a (meth)acrylate having an alicyclic structure is preferably contained as a constituent unit derived from the monomer (a2) having a radically polymerizable group of the macromonomer.

The (meth)acrylate having an alicyclic structure is particularly preferably isobornyl (meth)acrylate.

The content of the constituent unit derived from the (meth)acrylate having an alicyclic structure is preferably 0.1% to 20% by mass with respect to the total mass of the (meth)acrylic copolymer.

Since the adhesive power is improved, the (meth)acrylic copolymer of the present invention preferably contains, as the constituent unit c, a constituent unit derived from a carboxy group-containing (meth)acrylic monomer.

The content of the constituent unit derived from the carboxy group-containing (meth)acrylic monomer is preferably 0.1% to 20% by mass with respect to the total mass of the (meth)acrylic copolymer.

[(Meth)Acrylic Copolymer]

The weight average molecular weight of the (meth)acrylic copolymer of the present invention is preferably 5,000 to 2,000,000, more preferably 10,000 to 1,000,000, and still more preferably 30,000 to 350,000. In a case where the weight average molecular weight of the (meth)acrylic copolymer is equal to or more than the above lower limit value, the durability of the pressure-sensitive adhesive layer is excellent. In a case where the weight average molecular weight of the (meth)acrylic copolymer is equal to or less than the above range, handleability (compatibility with other components, coatability, hot-melt processability, or the like) is excellent.

The glass transition temperature (Tg) of the (meth)acrylic copolymer of the present invention is preferably 0° C. or lower and more preferably −5° C. or lower from the viewpoint of the pressure-sensitive adhesiveness.

The (meth)acrylic copolymer of the present invention can be produced by a known method using a known polymerization initiator. As the polymerization method, for example, known polymerization methods such as a solution polymerization method, a suspension polymerization method, a bulk polymerization method, and an emulsion polymerization method can be applied, and among them, a solution polymerization method is preferable.

The polymerization initiator is preferably a radical polymerization initiator.

Examples of the solvent in the solution polymerization include organic solvents such as acetone, toluene, xylene, propylene glycol monomethyl ether acetate, propylene glycol monomethyl ether, methyl isobutyl ketone, methyl ethyl ketone, n-butyl acetate, ethyl acetate, n-propyl acetate, i-propyl acetate, ethyl 3-ethoxypropionate, and isopropyl alcohol.

[Pressure-Sensitive Adhesive Composition/Pressure-Sensitive Adhesive]

The pressure-sensitive adhesive composition of the present invention contains the (meth)acrylic copolymer of the present invention.

The pressure-sensitive adhesive composition of the present invention may further contain components known in the pressure-sensitive adhesive composition. Examples of the known components in the pressure-sensitive adhesive composition include a solvent, a filler, a crosslinking agent, an adhesiveness imparting resin, an anti-oxidant, a light stabilizer, a metal inactivating agent, an anti-aging agent, a moisture absorbent, a rust-preventive agent, an anti-hydrolysis agent, and a reaction catalysts.

Examples of the anti-oxidant include a phenol-based, a phosphorus-based, a hydroxylamine-based, and a sulfur-based anti-oxidant. In a case where the anti-oxidant is blended, the blending amount is preferably 0.1 to 5 parts by mass with respect to 100 parts by mass of the (meth)acrylic copolymer.

The pressure-sensitive adhesive composition of the present invention may be an aspect of a liquid pressure-sensitive adhesive composition containing a solvent or may be an aspect of a hot-melt type pressure-sensitive adhesive composition containing no solvent.

The pressure-sensitive adhesive composition of the present invention is an active energy ray-curable type and can be cured to be used as a pressure-sensitive adhesive as necessary. The active energy ray is preferably an ultraviolet ray from the viewpoint of versatility. Examples of the light source of the ultraviolet ray include a xenon lamp, a high-pressure mercury lamp, a metal halide lamp.

Since the pressure-sensitive adhesive composition of the present invention contains the (meth)acrylic copolymer of the present invention, it is possible to form a pressure-sensitive adhesive layer exhibiting excellent base material contamination resistance. In addition, the obtained pressure-sensitive adhesive layer exhibits excellent transparency.

The pressure-sensitive adhesive of the present invention is obtained by irradiating the pressure-sensitive adhesive composition of the present invention with an ultraviolet ray.

[Pressure-Sensitive Adhesive Sheet]

The pressure-sensitive adhesive sheet of the present invention has a pressure-sensitive adhesive layer formed using the pressure-sensitive adhesive composition of the present invention. In one aspect, the pressure-sensitive adhesive sheet of the present invention has a pressure-sensitive adhesive layer containing the pressure-sensitive adhesive of the present invention obtained by irradiating the pressure-sensitive adhesive composition of the present invention with an ultraviolet ray.

The pressure-sensitive adhesive sheet of the present invention may be an aspect composed only of a pressure-sensitive adhesive layer obtained by molding the pressure-sensitive adhesive composition of the present invention into a sheet shape or may be an aspect of a laminate obtained by laminating a peelable base material on one or both sides of a pressure-sensitive adhesive layer which is formed by molding the pressure-sensitive adhesive composition of the present invention into a sheet shape.

The pressure-sensitive adhesive layer may be formed of the pressure-sensitive adhesive composition of the present invention or may be formed of a cured product of the pressure-sensitive adhesive composition of the present invention. From the viewpoint of handleability, it is preferable that the pressure-sensitive adhesive sheet is formed of the pressure-sensitive adhesive of the present invention, which is obtained by curing the pressure-sensitive adhesive composition of the present invention with an ultraviolet ray.

The pressure-sensitive adhesive layer formed of the pressure-sensitive adhesive composition of the present invention or the cured product of the pressure-sensitive adhesive composition of the present invention can be used as a transparent double-sided pressure-sensitive adhesive layer.

The thickness of the pressure-sensitive adhesive layer can be appropriately set according to the application. For example, the thickness thereof is preferably 10 to 500 μm and more preferably 20 to 100 μm.

The member that is bonded using the pressure-sensitive adhesive sheet of the present invention is not particularly limited. For example, the pressure-sensitive adhesive sheet of the present invention can be used for bonding a window-covering film for a vehicle, a building, or the like, bonding a label in label displaying, bonding a variety of kinds of panels such as a liquid crystal panel in displaying, and bonding a transparent plate material such as glass.

EXAMPLES

Hereinafter, the present invention will be described in more detail with reference to Examples, but the present invention is not limited to these Examples. Hereinafter, "part" means "part by mass".

In each of the examples, the following measurement method was used.

Measurement Method

Molecular Weight of Macromonomer

The measurement was performed using a gel permeation chromatography (GPC) apparatus (HLC-8320, manufactured by Tosoh Corporation). A tetrahydrofuran (THF) solution of 0.2% by mass of a macromonomer was prepared, and 10 μL of the prepared solution was injected into the above apparatus equipped with a column (TSKgel Super HZM-M×HZM-M×HZ2000, TSKguard column SuperHZ-L) manufactured by Tosoh Corporation, and the measurement was carried out under the conditions of a flow rate of 0.35 mL/min, an eluent of THF (stabilizer: butyl hydroxytoluene (BHT)), and a column temperature of 40° C. The number average molecular weight (Mn) and the weight average molecular weight (Mw) were calculated in terms of polystyrene.

(Weight Average Molecular Weight of Copolymer)

The weight average molecular weight (Mw) of the copolymer was measured using a GPC apparatus (manufactured by Tosoh Corporation, HLC-8120). A THF solution of 0.3% by mass of a copolymer was prepared, and 20 μL of the prepared solution was injected into the above apparatus equipped with a column (TSKgel Super HM-H×4, TSKguard column SuperH-H) manufactured by Tosoh Corporation, and the measurement was carried out under the conditions of a flow rate of 0.6 mL/min, an eluent of THF (stabilizer: BHT), and a column temperature of 40° C. The weight average molecular weight (Mw) was calculated in terms of polystyrene.

Evaluation Method (Preparation of Test Piece)

The copolymer solution of each of the examples was diluted with ethyl acetate to adjust the solid content so that a desired film thickness was obtained, thereby preparing a pressure-sensitive adhesive composition which was a liquid at room temperature (23° C.).

The pressure-sensitive adhesive composition was applied onto a PET film (hereinafter, also referred to as "PET") having a film thickness of 38 μm with an applicator, and drying was carried out at 90° C. for 1 hour to form a pressure-sensitive adhesive layer.

Using a high-pressure mercury lamp of 350 mW, the PET film on which the pressure-sensitive adhesive layer was formed was irradiated with an ultraviolet ray in the air to cure the pressure-sensitive adhesive layer. The irradiation energy was 106 mJ/cm$^2$ (the value measured by a cumulative light meter UV-350 (manufactured by OAK Corporation)). A peeling-treated polyethylene terephthalate (PET) film (hereinafter, also referred to as the "peeling PET") was laminated on the upper surface thereof to obtain a laminate having a configuration of a peeling PET—pressure-sensitive adhesive layer—PET. The thickness of the pressure-sensitive adhesive layer was 50 The cured laminate was cut into a strip having a width of 25 mm and a length of 250 mm to obtain a test piece.

(Evaluation Method of Adhesive Power)

The peeling PET of the test piece was peeled off to expose the pressure-sensitive adhesive layer, and the exposed pressure-sensitive adhesive layer was bonded to a stainless steel (SUS) plate of 30 mm×110 mm so that the bonding surface was 25 mm×70 mm using a hand roller of 3 kg. Then, the peeling strength (N/25 mm) with respect to the SUS plate was measured at a peeling angle of 180°, a tensile speed of 300 mm/min, and the measured value was used as the adhesive power.

(Evaluation Method of Holding Power at High Temperature)

The peeling PET at one end of the test piece was peeled off to expose the pressure-sensitive adhesive layer, and the exposed pressure-sensitive adhesive layer was horizontally bonded to a SUS plate of 30 mm×110 mm using a hand roller of 3 kg so that the bonding surface was 25×25 mm. The SUS plate was left for 15 minutes in a constant temperature and constant humidity layer tester having a temperature of 80° C. and a humidity of 35% or a humidity of 85%. Immediately after being left, the SUS plate was installed so that a force was applied to the bonding surface in the shearing direction, a load of 1.0 kg was applied with the other end of the test piece facing down, and the holding time was measured. The measured value was used as the holding power at the high temperature.

(Evaluation Method of Base Material Contamination Resistance)

The peeling PET of the test piece was peeled off to expose the pressure-sensitive adhesive layer, and the exposed pressure-sensitive adhesive layer was bonded to a SUS plate of 30 mm×110 mm using a hand roller of 3 kg so that the bonding surface was 25 nm×70 mm. Then, the test piece was peeled off under the same conditions as the evaluation method of the adhesive power, and the SUS surface was visually observed to determine the base material contamination resistance according to the following criteria.

A: There is no adhesive residue.
B: The area of adhesive residue is less than 30%.
C: The area of adhesive residue is 30% or more.

Production Example 1 [Production of Dispersant 1]

In a polymerization device equipped with a stirrer, a cooling tube, a thermometer, and a nitrogen gas-introducing tube, 900 parts of deionized water, 60 parts of sodium 2-sulfoethyl methacrylate, 10 parts of potassium methacrylate, and 12 parts of methyl methacrylate (MMA) were added and stirred, and the temperature inside the polymerization device was raised to 50° C. while replacing the atmosphere inside the polymerization device with nitrogen. Further, 0.08 parts of 2,2'-azobis(2-methylpropionamidine) dihydrochloride as a polymerization initiator was added thereto, and the temperature was raised to 60° C. After the temperature was raised, MMA was continuously added dropwise at a rate of 0.24 parts/minute for 75 minutes using a dropping pump. The mixture was kept at 60° C. for 6 hours and then cooled to room temperature to obtain a dispersant 1 having a solid content of 10% by mass.

Production Example 2 [Production of Chain Transfer Agent 1]

In a synthesis device equipped with a stirrer in a nitrogen atmosphere, 1.00 g of cobalt (II) acetate tetrahydrate, 1.93 g of diphenyl glyoxime, and 80 mL of diethyl ether deoxidized in advance by nitrogen bubbling were added and stirred at room temperature for 30 minutes. Further, 10 mL of a boron trifluoride diethyl ether complex was added thereto, and stirring was carried out for 6 hours. The mixture was filtered, the solid was washed with diethyl ether and vacuum-dried for 15 hours, whereby 2.12 g of chain transfer agent 1 which is a reddish brown solid was obtained.

Production Example 3 [Production of Macromonomer a-1]

In a polymerization device equipped with a stirrer, a cooling tube, a thermometer, and a nitrogen gas-introducing tube, 135 parts of deionized water, 0.1 parts of sodium sulfate, and 0.25 parts of the dispersant 1 (solid content: 10% by mass) were added and stirred to prepare a homogeneous aqueous solution. Further, 100 parts of MMA, 0.0022 parts of the chain transfer agent 1, and 0.4 parts of PEROCTA (registered trade name) O (1,1,3,3-tetramethylbutylperoxy 2-ethylhexanoate, manufactured by NOF Corporation) as a polymerization initiator were added thereto to prepare an aqueous suspension.

Further, the inside of the polymerization device was replaced with nitrogen, the temperature was raised to 80° C., stirred for 3.5 hours, and then, for further increasing the polymerization rate, the temperature was raised to 90° C. and held for 1 hour. Then, the mixture was cooled to 40° C. to obtain an aqueous suspension containing a macromonomer. The obtained aqueous suspension was filtered through a filter, the residue remaining on the filter was washed with deionized water, dehydrated, and dried at 40° C. for 16 hours to obtain a macromonomer a-1.

The molecular weight of this macromonomer a-1 is shown in Table 1.

Production Examples 4 to 9 [Production of Macromonomers a-2 to a-7]

Macromonomers a-2 to a-7 were produced in the same manner as in Production Example 3 except that the blending was changed as described in Table 1. The unit in the blending shown in Table 1 is described in terms of parts by mass. b1 in the table is 4-methacryloyloxybenzophenone.

TABLE 1

| Production Example | | | 3 | 4 | 5 | 6 | 7 | 8 | 9 |
|---|---|---|---|---|---|---|---|---|---|
| Macromonomer a | | | a-1 | a-2 | a-3 | a-4 | a-5 | a-6 | a-7 |
| Blending [parts by mass] | Monomer a1 | MMA | 100 | 99.5 | 90 | 80 | 95 | 0 | 50 |
| | Monomer a2 | IBXMA | 0 | 0 | 0 | 0 | 0 | 100 | 49.99 |
| | Monomer | IBMA | 0 | 0 | 0 | 0 | 0 | 0 | 0.01 |

TABLE 1-continued

| Production Example | | | 3 | 4 | 5 | 6 | 7 | 8 | 9 |
|---|---|---|---|---|---|---|---|---|---|
| Macromonomer a | | | a-1 | a-2 | a-3 | a-4 | a-5 | a-6 | a-7 |
| | a3 | | | | | | | | |
| | Monomer b | b1 | 0 | 0.5 | 10 | 20 | 5 | 0 | 0 |
| | Solvent | Deionized water | 145 | 145 | 145 | 145 | 145 | 145 | 145 |
| | Initiator | PEROCTA O | 0.4 | 0.5 | 0.4 | 0.4 | 0.4 | 0.6 | 0.5 |
| | Dispersant 1 | | 0.25 | 0.524 | 0.524 | 0.524 | 0.524 | 0.253 | 0.253 |
| | Chain transfer agent 1 | | 0.0022 | 0.0022 | 0.0022 | 0.0022 | 0.0015 | 0.009 | 0.002 |
| | Sodium sulfate | | 0.1 | 0.1 | 0.1 | 0.1 | 0.1 | 0.1 | 0.1 |
| Molecular weight | Number average molecular weight Mn | | 3000 | 2800 | 3000 | 4300 | 3400 | 2600 | 2700 |
| | Weight average molecular weight Mw | | 5800 | 4800 | 6800 | 10400 | 7100 | 8100 | 6300 |

The notations in the table have the following meanings.
MMA: methyl methacrylate
IBXMA: isobornyl methacrylate
IBMA: isobuty methacrylate

Example 1 [Production of (meth)acrylic Copolymer A-1]

40 parts of ethyl acetate and 7.7 parts of IPA were added in a four-necked flask equipped with a stirrer, a thermometer, a cooling tube, and a nitrogen gas-introducing tube, and the external temperature was raised to 85° C. under the nitrogen gas ventilation. After the external temperature reached 85° C. and the internal temperature was stabilized, a mixture composed of 20 parts of ethyl acetate, 5 parts of the macromonomer a-1, 94.7 parts of BA, 0.30 parts of b1, and 0.13 parts of NYPER (registered trade name) BMT-K40 (manufactured by NOF Corporation, trade name) was added to the flask dropwise over 4 hours. After holding for 1 hour after completion of the dropwise addition, a mixture composed of 0.5 part of PEROCTA O and 10 parts of ethyl acetate was added thereto over 30 minutes. Thereafter, after holding for 2 hours, 0.5 part of an anti-oxidant (manufactured by BASF SE, trade name "Irganox (registered trade name) 1010") was added, ethyl acetate was added so that the solid content (the proportion of the charged amount of the monomer in (the monomer+the charged amount of the solvent), the same applies hereinafter) was 53% by mass, and then cooled to room temperature to obtain a copolymer solution A-1 containing a (meth)acrylic copolymer A-1.

Table 2 shows the content of the constituent unit b with respect to the total mass of the (meth)acrylic copolymer, and the weight average molecular weight and the glass transition temperature (the calculated values) of the obtained copolymer.

Examples 2 to 18 and Comparative Examples 1 to 3

Copolymer solutions containing a (meth)acrylic copolymer were obtained in the same manner as in Example 1 except that the compositions were changed as described in Tables 2 to 5.

The unit in the blending shown in Tables 2 to 5 is described in terms of parts by mass.

Using the copolymer solution obtained in each of Examples and each of

Comparative Examples, a test piece was prepared by the above method, and the adhesive power, the holding power, and the base material contamination resistance were evaluated.

The results are shown in Tables 2 to 5.

TABLE 2

| | | | Example | | | | |
|---|---|---|---|---|---|---|---|
| | | | 1 | 2 | 3 | 4 | 5 |
| Composition | Solvent | Ethyl acetate | 81.1 | 81.1 | 81.1 | 81.1 | 81.1 |
| | | IPA | 7.7 | 7.7 | 7.7 | 7.7 | 7.7 |
| | Macromonomer | a-1 | 5 | 5 | 5 | 5 | 5 |
| | | a-2 | | | | | |
| | | a-3 | | | | | |
| | | a-4 | | | | | |
| | | a-5 | | | | | |
| | | a-6 | | | | | |
| | | a-7 | | | | | |
| | Monomer | MMA | | | | | |
| | | n-BA | 94.7 | 89.7 | 86.7 | 84.7 | 91.5 |
| | | EHA | | | | | |
| | | AA | | 5 | 8 | 10 | 3 |
| | | b1 | 0.30 | 0.30 | 0.30 | 0.30 | 0.50 |
| | | b2 | | | | | |
| Weight average molecular weight/$10^3$ | | | 133 | 118 | 132 | 136 | 130 |
| Calculated Tg (° C.) | | | −40.1 | −35.2 | −32.2 | −30.2 | −37.0 |

TABLE 2-continued

|  |  | Example | | | | |
|---|---|---|---|---|---|---|
|  |  | 1 | 2 | 3 | 4 | 5 |
| Content of constituent unit b | | 0.30 | 0.30 | 0.30 | 0.30 | 0.50 |
| 130° C. melt viscosity (Pa·s) | | 31.5 | 73.1 | 135.8 | 203.0 | 49.5 |
| Adhesive power (N/25 mm) | | 7.2 | 8.7 | 9.4 | 13.0 | 2.9 |
| Adhesive residue | | A | A | A | A | A |
| Area of adhesive residue | | 0% | 0% | 0% | 0% | 0% |
| Holding power(s) | 1 kg, 80° C./humidity 35% | 86400< | 86400< | 86400< | 86400< | 86400< |
|  | 1 kg, 80° C./humidity 85% | 86400< | 86400< | 86400< | 86400< | 86400< |

TABLE 3

|  |  |  | Example | | | | |
|---|---|---|---|---|---|---|---|
|  |  |  | 6 | 7 | 8 | 9 | 10 |
| Composition | Solvent | Ethyl acetate | 81.1 | 81.1 | 81.1 | 81.1 | 81.1 |
|  |  | IPA | 7.7 | 7.7 | 7.7 | 7.7 | 7.7 |
|  | Macro-monomer | a-1 | 2.5 | 10 | | | |
|  |  | a-2 | | | 5 | | |
|  |  | a-3 | | | | 10 | 10 |
|  |  | a-4 | | | | | |
|  |  | a-5 | | | | | |
|  |  | a-6 | | | | | |
|  |  | a-7 | | | | | |
|  | Monomer | MMA | | | | | |
|  |  | n-BA | 94.2 | 84.75 | 94.725 | 85.75 | |
|  |  | EHA | | | | | 85.75 |
|  |  | AA | 3 | 4 | | 4 | 4 |
|  |  | b1 | 0.30 | 1.25 | 0.275 | 0.25 | 0.25 |
|  |  | b2 | | | | | |
| Weight average molecular weight/$10^3$ | | | 121 | 158 | 127 | 114 | 77 |
| Calculated Tg (° C.) | | | −39.6 | −30.2 | −40.1 | −31.3 | −40.9 |
| Content of constituent unit b | | | 0.30 | 1.25 | 0.30 | 1.25 | 1.25 |
| 130° C. melt viscosity (Pa·s) | | | 34.1 | 162.8 | 28.3 | 84.0 | 477.0 |
| Adhesive power (N/25 mm) | | | 7.2 | 1.9 | 6.9 | 11.3 | 1.1 |
| Adhesive residue | | | A | A | A | A | A |
| Area of adhesive residue | | | 0% | 0% | 0% | 0% | 0% |
| Holding power(s) | 1 kg, 80° C./humidity 35% | | 18148 | 86400< | 86400< | 86400< | 86400< |
|  | 1 kg, 80° C./humidity 85% | | 14139 | 86400< | 10332 | 86400< | 86400< |

TABLE 4

|  |  |  | Example | | | | |
|---|---|---|---|---|---|---|---|
|  |  |  | 11 | 12 | 13 | 14 | 15 |
| Composition | Solvent | Ethyl acetate | 81.1 | 81.1 | 81.1 | 81.1 | 81.1 |
|  |  | IPA | 7.7 | 7.7 | 7.7 | 7.7 | 7.7 |
|  | Macro-monomer | a-1 | | | | | |
|  |  | a-2 | | | | | |
|  |  | a-3 | | | | | |
|  |  | a-4 | 10 | 10 | 10 | 10 | |
|  |  | a-5 | | | | | 20 |
|  |  | a-6 | | | | | |
|  |  | a-7 | | | | | |
|  | Monomer | MMA | | | | | |
|  |  | n-BA | 87 | 82 | 77 | 72 | 75.75 |
|  |  | EHA | | | | | |
|  |  | AA | | | | | 4 |
|  |  | b1 | 3 | 8 | 13 | 18 | 0.25 |
|  |  | b2 | | | | | |
| Weight average molecular weight/$10^3$ | | | 140 | 151 | 177 | 158 | 126 |
| Calculated Tg (° C.) | | | −32.3 | −26.9 | −21.3 | −15.3 | −20.6 |

TABLE 4-continued

|  | Example | | | | |
|---|---|---|---|---|---|
|  | 11 | 12 | 13 | 14 | 15 |
| Content of constituent unit b | 5 | 10 | 15 | 20 | 0.25 |
| 130° C. melt viscosity (Pa·s) | 449.3 | 708.1 | 932.1 | 1044 | 892.5 |
| Adhesive power (N/25 mm) | 0.6 | 0.6 | 0.3 | 0.2 | 4.0 |
| Adhesive residue | A | A | A | A | A |
| Area of adhesive residue | 0% | 0% | 0% | 0% | 0% |
| Holding power(s) 1 kg, 80° C./humidity 35% | 86400< | 86400< | 86400< | 86400< | 86400< |
| 1 kg, 80° C./humidity 85% | 86400< | 86400< | 86400< | 86400< | 86400< |

TABLE 5

|  |  |  | Example | | | Comparative Example | | |
|---|---|---|---|---|---|---|---|---|
|  |  |  | 16 | 17 | 18 | 1 | 2 | 3 |
| Composition | Solvent | Ethyl acetate | 81.1 | 81.1 | 81.1 | 81.1 | 81.1 | 81.1 |
|  |  | IPA | 7.7 | 7.7 | 7.7 | 7.7 | 8 | 7.7 |
|  | Macro-monomer | a-1 |  |  | 5 |  |  | 5 |
|  |  | a-2 |  |  |  |  |  |  |
|  |  | a-3 |  |  |  |  |  |  |
|  |  | a-4 |  |  |  | 10 |  |  |
|  |  | a-5 |  |  |  |  |  |  |
|  |  | a-6 | 5 |  |  |  |  |  |
|  |  | a-7 |  | 5 |  |  |  |  |
|  | Monomer | MMA |  |  |  |  | 10 |  |
|  |  | n-BA | 94.7 | 94.7 | 89.64 | 62 | 85.75 | 92 |
|  |  | EHA |  |  |  |  |  |  |
|  |  | AA |  |  | 5 | 4 | 3 |  |
|  |  | b1 | 0.30 | 0.30 |  | 28.00 | 0.25 | 0 |
|  |  | b2 |  |  | 0.36 |  |  |  |
| Weight average molecular weight/10³ |  |  | 135 | 137 | 161 | 123 | 155 | 127 |
| Calculated Tg (° C.) |  |  | −39.2 | −39.7 | −35.2 | −2.6 | −31.3 | −37.5 |
| Content of constituent unit b |  |  | 0.30 | 0.30 | 0.30 | 30 | 0.25 | 0.00 |
| 130° C. melt viscosity (Pa·s) |  |  | 26.6 | 21.4 | 89.4 | 1488 | 164.5 | 40.0 |
| Adhesive power (N/25 mm) |  |  | 7.9 | 8.1 | 7.9 | — | 12.9 | 14.8 |
| Adhesive residue |  |  | A | A | A | — | C | C |
| Area of adhesive residue |  |  | 0% | 0% | 0% | — | 35% | ≥90% |
| Holding power(s) 1 kg, 80° C./humidity 35% |  |  | 86400< | 86400< | 86400< | — | 4 | 1 |
| 1 kg, 80° C./humidity 85% |  |  | 86400< | 86400< | 86400< | — | — | — |

The notations in the table have the following meanings.
IPA: isopropyl alcohol
MMA: methyl methacrylate
n-BA: n-butyl acrylate
EHA: 2-ethylhexyl acrylate
AA: acrylic acid
b1: 4-methacryloyloxybenzophenone
b2: 4-[2-(methacryloyloxy)ethoxy]benzophenone In Comparative Example 1, since the content of the constituent unit b was too high, the melt viscosity was high and the coatability was poor, and thus a test piece could not be prepared.

In Comparative Example 2, since the macromonomer was not used, the adhesive power, the base material contamination resistance, and the holding power were insufficient.

In Comparative Example 3, since the constituent unit b was not contained, the adhesive power, the base material contamination resistance, and the holding power were insufficient.

The invention claimed is:

1. A pressure-sensitive adhesive composition comprising a (meth)acrylic copolymer, the (meth)acrylic copolymer comprising a constituent unit a derived from a macromonomer, a constituent unit b derived from a monomer represented by Formula (b), and a constituent unit c:

wherein the macromonomer comprises two or more of a constituent unit X1 represented by formula X1:

(X1)

in formula (X1),
R¹ represents a hydrogen atom, a methyl group, or CH$_2$OH, and
R² represents OR³, a halogen atom, COR⁴, COOR⁵, CN, CONR⁶R⁷, NHCOR⁸ or R⁹,
R³ to R⁸ each independently represent a hydrogen, a substituted or unsubstituted alkyl group, a substituted or unsubstituted alicyclic group, a substituted or unsubstituted aryl group, a substituted or unsubstituted heteroaryl group, a substituted or unsubstituted nonaromatic heterocyclic group, a substituted or unsubstituted aralkyl group, a substituted or unsubstituted alkaryl group, a substituted or unsubstituted organosilyl group, or a substituted or unsubstituted polyorganosiloxane, and $R^9$ represents a substituted or unsubstituted aryl group, a substituted or unsubstituted heteroaryl group, or a substituted or unsubstituted nonaromatic heterocyclic group,

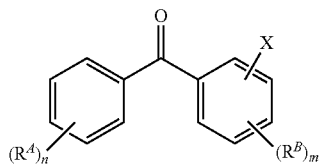

(b)

in Formula (b),
$R^A$ and $R^B$ each independently represent an alkyl group, a carboxyl group, or a halogen atom,
n represents 0,
m represents 0, and
X represents a (meth)acryloyloxy group or a (meth)acryloyloxyalkyleneoxy group,
the constituent unit c comprises the constituent unit X1,
an amount of the constituent unit b is 0.01 to 25 wt % with respect to a total amount of the (meth)acrylic copolymer, and
the glass transition temperature of the (meth)acrylic copolymer is −5° C. or lower.

2. The pressure-sensitive adhesive composition according to claim 1, wherein a weight average molecular weight of the macromonomer is 500 to 100,000.

3. The pressure-sensitive adhesive composition according to claim 1, wherein the macromonomer includes the constituent unit b.

4. The pressure-sensitive adhesive composition according to claim 1, wherein an amount of the constituent unit a is 0.1 to 40 wt % with respect to the total amount of the (meth)acrylic copolymer.

5. The pressure-sensitive adhesive composition according to claim 1, wherein the (meth)acrylic copolymer includes a constituent unit derived from a (meth)acrylate having an alicyclic structure.

6. The pressure-sensitive adhesive composition according to claim 5, wherein the (meth)acrylate having an alicyclic structure comprises isobornyl (meth)acylate.

7. The pressure-sensitive adhesive composition according to claim 5, wherein an amount of the (meth)acrylate having an alicyclic structure is 0.1 to 20 wt % with respect to the total amount of the (meth)acrylic copolymer.

8. The pressure-sensitive adhesive composition according to claim 1, wherein the (meth)acrylic copolymer comprises a constituent unit derived from a (meth)acrylate having a carboxylic group.

9. The pressure-sensitive adhesive composition according to claim 8, wherein an amount of the constituent unit derived from a (meth)acrylate having a carboxylic group is 0.1 to 20 wt % with respect to the total amount of the (meth)acrylic copolymer.

10. The pressure-sensitive adhesive composition according to claim 1, wherein the monomer represented by Formula (b) comprises 4-acryloyloxybenzophenone, 4-methacryloyloxybenzophenone, 4-[2-(acryloyloxy)ethoxyl]benzophenone, or 4-[2-(methacyloyloxy)ethoxyl]benzophenone.

11. The pressure-sensitive adhesive composition according to claim 1, wherein, in Formula (b), X represents the (meth)acryloyloxy group.

12. The (pressure-sensitive adhesive composition according to claim 1, wherein, in Formula (b), X represents the (meth)acryloyloxyalkyleneoxy group.

13. The pressure-sensitive adhesive composition according to claim 1, wherein the (meth)acrylic copolymer comprises an adhesive power (N/25 mm) of 0.2 to 13.0.

14. A pressure-sensitive adhesive prepared by exposing the adhesive composition according to claim 1 to an ultraviolet radiation.

15. An adhesive sheet comprising an adhesive layer comprising the pressure-sensitive adhesive according to claim 14.

* * * * *